(12) United States Patent
Chester et al.

(10) Patent No.: US 7,451,003 B2
(45) Date of Patent: Nov. 11, 2008

(54) METHOD AND SYSTEM OF MONITORING, SENSOR VALIDATION AND PREDICTIVE FAULT ANALYSIS

(75) Inventors: Daniel L. Chester, Newark, DE (US); Stephen L. Daniel, Williamsville, NY (US); Richard J. Fickelscherer, Forestville, NY (US); Douglas H. Lenz, East Amherst, NY (US)

(73) Assignee: Falconeer Technologies LLC, Williamsville, NY (US)

( * ) Notice: Subject to any disclaimer, the term of this patent is extended or adjusted under 35 U.S.C. 154(b) by 468 days.

(21) Appl. No.: 10/793,162

(22) Filed: Mar. 4, 2004

(65) Prior Publication Data
US 2005/0210337 A1   Sep. 22, 2005

(51) Int. Cl.
*G05B 13/02* (2006.01)
*G01F 1/00* (2006.01)
*G01F 7/00* (2006.01)

(52) U.S. Cl. ............................ 700/28; 700/29; 700/50

(58) Field of Classification Search .................. 700/26, 700/28–31, 46–47, 48–51, 104, 73–74, 108; 702/246, 47, 179–185, 32; 703/2; 706/16, 706/23, 8; 714/37–38, 46–48, 25; 370/338; 701/3, 99

See application file for complete search history.

(56) References Cited

U.S. PATENT DOCUMENTS

| | | | |
|---|---|---|---|
| 4,298,955 A | 11/1981 | Munday et al. | |
| 4,517,468 A | 5/1985 | Kemper et al. | |
| 4,552,718 A | 11/1985 | Impink, Jr. et al. | |
| 4,644,479 A | 2/1987 | Kemper et al. | |
| 4,761,748 A | 8/1988 | Le Rat et al. | |
| 4,772,445 A | 9/1988 | Nasrallah et al. | |
| 4,803,040 A | 2/1989 | Gross | |
| 4,816,208 A | 3/1989 | Woods et al. | |
| 5,009,833 A | 4/1991 | Takenchi et al. | |
| 5,223,207 A | 6/1993 | Gross et al. | |
| 5,386,373 A | 1/1995 | Keeler et al. | |
| 5,442,562 A | 8/1995 | Hopkins et al. | |

(Continued)

OTHER PUBLICATIONS

"Moving average"—wikipedia (http://en.wikipedia.org/wiki/EWMA).*

(Continued)

*Primary Examiner*—Ryan A. Jarrett
*Assistant Examiner*—Sunray R Chang
(74) *Attorney, Agent, or Firm*—Phillips Lytle LLP

(57) ABSTRACT

The present invention provides an improved method and system for real-time monitoring, validation, optimization and predictive fault analysis in a process control system. The invention monitors process operations by continuously analyzing sensor measurements and providing predictive alarms using models of normal process operation and statistical parameters corresponding to normal process data, and generating secondary residual process models. The invention allows for the creation of a fault analyzer directly from linearly independent models of normal process operation, and provides for automatic generation from such process models of linearly dependent process models. Fuzzy logic is used in various fault situations to compute certainty factors to identify faults and/or validate underlying assumptions. In one aspect, the invention includes a real-time sensor data communications bridge module; a state transition logic module; a sensor validation and predictive fault analysis module; and a statistical process control module; wherein each of the modules operates simultaneously.

116 Claims, 3 Drawing Sheets

U.S. PATENT DOCUMENTS

| | | | |
|---|---|---|---|
| 5,469,447 | A | 11/1995 | Brunemann, Jr. et al. |
| 5,487,134 | A | 1/1996 | Ballard |
| 5,548,528 | A | 8/1996 | Keeler et al. |
| 5,548,597 | A | 8/1996 | Kayama et al. |
| 5,566,092 | A * | 10/1996 | Wang et al. ............ 702/185 |
| 5,570,300 | A | 10/1996 | Henry et al. |
| 5,574,387 | A | 11/1996 | Petsche et al. |
| 5,586,066 | A | 12/1996 | White et al. |
| 5,592,396 | A * | 1/1997 | Tambini et al. ............. 702/45 |
| 5,602,761 | A * | 2/1997 | Spoerre et al. ............ 702/179 |
| 5,629,872 | A | 5/1997 | Gross et al. |
| 5,633,800 | A | 5/1997 | Bankert et al. |
| 5,661,735 | A | 8/1997 | Fischer |
| 5,680,409 | A | 10/1997 | Qin et al. |
| 5,761,090 | A | 6/1998 | Gross et al. |
| 5,808,919 | A | 9/1998 | Preist et al. |
| 5,922,079 | A | 7/1999 | Booth et al. |
| 5,949,678 | A | 9/1999 | Wold et al. |
| 5,987,398 | A | 11/1999 | Halverson et al. |
| 6,017,143 | A * | 1/2000 | Eryurek et al. ............. 700/51 |
| 6,041,287 | A | 3/2000 | Dister et al. |
| 6,108,616 | A | 8/2000 | Borchers et al. |
| 6,110,214 | A * | 8/2000 | Klimasauskas ............... 703/2 |
| 6,182,022 | B1 | 1/2001 | Mayle et al. |
| 6,246,972 | B1 | 6/2001 | Klimasauskas |
| 6,298,454 | B1 * | 10/2001 | Schleiss et al. ............. 714/37 |
| 6,356,857 | B1 | 3/2002 | Qin et al. |
| 6,397,114 | B1 | 5/2002 | Eryurek et al. |
| 6,430,544 | B1 | 8/2002 | Childress |
| 6,438,430 | B1 * | 8/2002 | Martin et al. ............... 700/28 |
| 6,453,308 | B1 | 9/2002 | Zhao et al. |
| 6,473,660 | B1 | 10/2002 | Thibault |
| 6,557,118 | B2 | 4/2003 | Schleiss et al. |
| 6,571,224 | B1 * | 5/2003 | He et al. .................. 706/8 |
| 6,594,620 | B1 | 7/2003 | Qin et al. |
| 6,615,090 | B1 * | 9/2003 | Blevins et al. ............. 700/26 |
| 6,615,117 | B2 * | 9/2003 | Li et al. .................. 701/13 |
| 6,813,532 | B2 * | 11/2004 | Eryurek et al. ............ 700/108 |
| 6,859,739 | B2 * | 2/2005 | Wegerich et al. ............ 702/32 |
| 6,873,610 | B1 * | 3/2005 | Noever ................. 370/338 |
| 6,907,383 | B2 * | 6/2005 | Eryurek et al. ............ 702/183 |
| 6,944,551 | B2 * | 9/2005 | Chen et al. ............... 702/49 |
| 6,975,962 | B2 * | 12/2005 | Wegerich et al. ........... 702/182 |
| 2002/0029130 | A1 * | 3/2002 | Eryurek et al. ............ 702/183 |
| 2002/0133320 | A1 * | 9/2002 | Wegerich et al. ............ 703/2 |
| 2002/0152056 | A1 | 10/2002 | Hnrzog et al. |
| 2002/0161940 | A1 * | 10/2002 | Eryurek et al. ............ 710/15 |
| 2003/0208326 | A1 * | 11/2003 | Chen et al. ............... 702/49 |
| 2004/0249583 | A1 * | 12/2004 | Eryurek et al. ............ 702/47 |
| 2005/0021212 | A1 * | 1/2005 | Gayme et al. .............. 701/99 |
| 2006/0020424 | A1 * | 1/2006 | Quindel ................ 702/183 |

OTHER PUBLICATIONS

"Autoregressive moving average model"—wikipedia (http://en.wikipedia.org/wiki/Autoregressive_moving_average).*

Chemical Processing, "real-Time Sensor Validation Makes FMC Plant Smarter", Jan. 2004.*

"Moving average"—wikipedia (http://en.wikipedia.org/wiki/EWMA), 2007.*

"Autoregressive moving average model"—wikipedia (http://en.wikipedia.org/wiki/Autoregressive_moving_average), 2007.*

M.A. Kramer, Malfunction Diagnosis Using Quantitative Models with Non-Boolean Reasoning in Expert Systems, AlChE Journal, Jan. 1987, vol. 33, No. 1, pp. 130-140, U.S.

* cited by examiner

METHOD AND SYSTEM OF MONITORING, SENSOR VALIDATION AND PREDICTIVE FAULT ANALYSIS

TECHNICAL FIELD

The present invention relates generally to fault analysis and, more particularly, to a method and system for real-time monitoring, sensor validation, optimization and predictive fault analysis in a process control system.

BACKGROUND OF THE INVENTION

Process control systems for industrial applications have existed in many forms for a number of years. Several products, methods and systems have been developed to monitor and validate sensors in such systems and diagnose faults which might occur in such systems. Standard fault management products are based on creating predictive models using multivariate statistics and/or abnormal operation information. Such models, including neural networks and other complex models, are often difficult for an end-user (such as a manufacturing engineer or other operator) to understand, maintain or even trust. In addition, such models may not be scalable to real fault conditions and are only as good as the set of data provided, which by nature does not encompass all process operating conditions. Therefore, such models may not be robust enough to reliably predict or identify all abnormal or non-steady-state conditions, i.e., the reason for a fault management tool in the first place. Also, existing diagnostic methods and systems based on boolean logic may suffer from "diagnostic instability." In addition, the cost of prior art systems such as statistical models, expert systems, neural networks, smart sensors and redundant sensors may be very high.

Several methods and software systems have been developed to monitor process control systems and perform sensor validation. For example, U.S. Pat. No. 6,246,972 (Klimasauskas) discloses an analyzer for modeling and optimizing maintenance operation. U.S. Pat. No. 6,356,857 (Qin et al.) discloses a sensor validation apparatus and method, but not a fault analyzer. Other patents, such as U.S. Pat. No. 5,987,398 (Halverson et al.), disclose the use of statistical process control in the context of a process control system. Other examples of sensor validation, fault analyzer or faulty sensor identification patents include U.S. Pat. No. 6,594,620 (Qin et al.), U.S. Pat. No. 5,442,562 (Hopkins et al.) and U.S. Pat. No. 5,949,678 (Wold et al.). None of the foregoing patents utilizes the method of the present invention, which has significant advantages, as described below. Furthermore, no prior art system provides for simultaneous real-time sensor data collection, sensor validation and predictive fault analysis, and statistical process control.

There is a need, therefore, for an improved method and system of monitoring, validation and predictive fault analysis for process control systems, such as those in chemical plants, which overcomes these deficiencies; includes an evaluation of process models derived from normal data and using real-time measured process data; and provides, among other things, continuous and direct analysis which alerts end-users to potential underlying process problems.

BRIEF SUMMARY OF THE INVENTION

The present invention provides an improved method and system of simultaneous real-time monitoring, validation, optimization and predictive fault analysis in a process control system. In certain aspects, the present invention monitors current process operations by continuously analyzing process sensor measurements and alerting process operators and other end-users when appropriate. The system of the present invention goes beyond typical process alarm systems, which only alert at extreme conditions after failure or fault have occurred. The invention provides predictive or pre-emptive alerts (also referred to herein as alarms) by using linear and non-linear models of normal process operation, also referred to as primary process models, and statistical parameters corresponding to normal process data, and generating secondary residual process models, which may be automatically regenerated as needed. The invention allows for the creation of a fault analyzer directly from linearly independent models of normal process operation, which greatly simplifies implementation and maintenance. In addition, the invention provides for automatic generation from such linearly independent process models of linearly dependent process models, referred to herein as secondary residual process models, which no longer depend upon common eliminated variable(s), and which provide important information as to the state of a process control system. In addition, fuzzy logic is used in various fault situations to compute certainty factors to identify faults and/or validate underlying assumptions. In this regard, fuzzy logic diagnostic rules are derived automatically and may be regenerated each time they are used. The certainty factors also eliminate "diagnostic instability" associated with boolean based systems or methods.

The system and method of the present invention also accounts for both measured process variables, i.e., observed, and the correctness of assumed values of unmeasured variables, i.e., unobserved. Both measured and unmeasured variables, in certain aspects, are explicitly included in the process models representing the associated system. In some aspects of the invention, statistical process control ("SPC") charting techniques are used to determine if sensors are in control. Such SPC techniques include exponentially weighted moving averages ("EWMA") of sensor readings, i.e. real-time sensor data. In one aspect, historical data is regressed to determine normal offsets and variances of the process models being used, and weighting factors and normal variability for the EWMA calculations of the sensors monitored. Once such values are determined, the invention continuously monitors real-time process sensor measurements and determines their status and the underlying status of the process components themselves. "Intelligent alarms" allow process operators to more effectively control the operation of the associated process control system.

In one aspect, the method of sensor validation and fault analysis comprises the following steps: generating a plurality of primary residual process models derived from the control system's primary process models, the normal process data, and one or more of the calculated statistical parameters; measuring real-time sensor data; computing primary residual values of the primary residual process models corresponding to such real-time sensor data; comparing the primary residual values to expected values; and computing certainty factor(s) for possible fault(s) using fuzzy logic. Other aspects of the invention include calculating statistical parameters corresponding to normal process data in a process control system.

Other aspects of the invention include one or more of these steps: computing certainty factor(s) for each of the primary residual values. Another aspect includes the measuring of normal process data. In one aspect, the fuzzy logic used to compute certainty factors is defined in a diagnostic rule as follows:

FAULT-IS-PRESENT=SOME (evidence-for-fault)
AND ALL (neutral-evidence) AND NOT (SOME
(evidence-against-fault))

The sets described in this diagnostic rule are determined, in certain aspects of the invention, as follows: determining the direction(s) of the deviation(s), if any, of the primary and/or secondary residual values from expected values and determining evidence-for-fault and evidence-against-fault by comparing the direction of deviation with an expected direction consistent with a fault; and determining neutral-evidence from primary and/or secondary residual process models which do not depend upon the relevant process variable by comparing the magnitude of a deviation to zero. The diagnostic rule may be regenerated each time it is used. In another aspect, the invention provides for generating one or more secondary residual process models, wherein each of said secondary residual process models is derived from two primary residual process models having at least one common process variable. Other aspects of the invention may also include: computing secondary residual values of the secondary residual process models corresponding to real-time sensor data, and comparing the secondary residual values to expected values. The invention may include computing a certainty factor corresponding to each of the secondary residual values and may include computing a certainty factor for a possible fault as a function of one or more of the secondary residual values using fuzzy logic. In one aspect, this includes determining neutral-evidence from one or more of the secondary residual process models which do not relate to relevant process variables. In certain aspects, the statistical parameters described above comprise a mean and a standard deviation. In other aspects, the primary and/or secondary residual process models are functions of both a measured process variable and/or an unmeasured process variable, and are automatically generated. They may be automatically regenerated. In other aspects, first partial derivatives and/or second partial derivatives of the primary and/or secondary residual process models are computed. The invention provides for reporting certainty factors if they exceed a predetermined threshhold, and displaying certainty factors on a monitor. Another aspect of the invention includes computing a compressed value. Other aspects include prediction, detection and analysis of multiple faults. In other aspects of the invention, the generation of a plurality of primary residual models is not undertaken. In other aspects, the invention includes a computer-readable medium having computer-executable instructions for performing the foregoing.

Another aspect of the invention includes the following steps: generating a plurality of primary residual process models derived from the primary process models, the normal process data, and one or more statistical parameters corresponding to the normal process data; generating one or more secondary residual process models, wherein each of the secondary residual process models is derived from two primary residual process models having at least one common variable; and using one or more of the primary residual process models and one or more of the secondary residual process models to predict a possible fault. Another aspect includes these steps: generating a plurality of primary residual process models derived from the primary process models, the normal process data, and one or more statistical parameters corresponding to the normal process data; translating the primary residual process models into pseudo-code; measuring real-time sensor data; executing the pseudo-code to compute primary residual values corresponding to the real-time sensor data; comparing the primary residual values to expected values; and computing a certainty factor for a possible fault by executing said pseudo-code. In certain aspects, the pseudo-code uses fuzzy logic, which may be defined in a diagnostic rule as above. Other steps include: generating pseudo-code for computing a certainty factor; computing a certainty factor corresponding to each primary residual value; translating secondary residual process models into pseudo-code; executing the pseudo-code to compute secondary residual values; and computing a certainty factor using fuzzy logic.

The monitoring, validation and analysis system of the present invention includes a real-time sensor data communication bridge module; a state transition logic module; and a sensor validation and fault analysis module; wherein each of these modules operates simultaneously. The system may also include a statistical process control module, an operator display module, a database module and/or an alarm system module and other modules. In another aspect, the invention includes a master module which coordinates the operation of one or more of the other modules. The system may also include a model compiler and/or fault analyzer. The process control system of this invention includes such monitoring, validation and analysis system. The phrase "module" is not limited to a unit of code in the modular programming style, but may be construed more generally to mean a component of the invention.

Among other things, the invention significantly reduces the amount of computer code which users must maintain, by up to two orders of magnitude. In one embodiment, the invention requires only that 1000 to 2000 database fields be specified for a typical process control system. The invention may be implemented through pseudo-code, or native code such as Visual Basic, or other instructions. In addition to single fault analysis and data validation, the invention performs multiple fault analysis (which would require more than an order of magnitude more code in prior art systems) and performs SPC on all the controlled and uncontrolled sensor measurements. It is also trivial to add/delete either more process variables or models of normal process operation and recompile the application to include such changes. In one embodiment, the only items maintained are various process variables (both measured and unmeasured) and models of normal process operation directly describing relationships between those variables. This greatly simplifies the creation and maintenance of software programs or code because, among other things, the means of creating all possible secondary models and all the diagnostic/inferential reasoning is contained as the implemented underlying invention, which does not change for different applications.

The general object of the invention is to provide an improved method and system to predict, detect and correct system faults or failures before they cause operating problems and losses. Another object is to provide a sensor validation and predictive fault analysis system which is simple to understand, maintain and operate. Another object is to provide a system and method which diagnoses multiple fault situations. Another object is to provide a continuous, real-time sensor validation and fault analysis method and system which results in reduced costs and improved safety, reliability and operations. The invention also results in less code, which is more adaptable to process conditions and changes. Yet another object is to provide a system which improves quality control and provides for process optimization. These and other objects and advantages will become apparent from the foregoing and ongoing written specification, the accompanying drawings and the appended claims.

DESCRIPTION OF THE PREFERRED EMBODIMENTS

Figure 1:
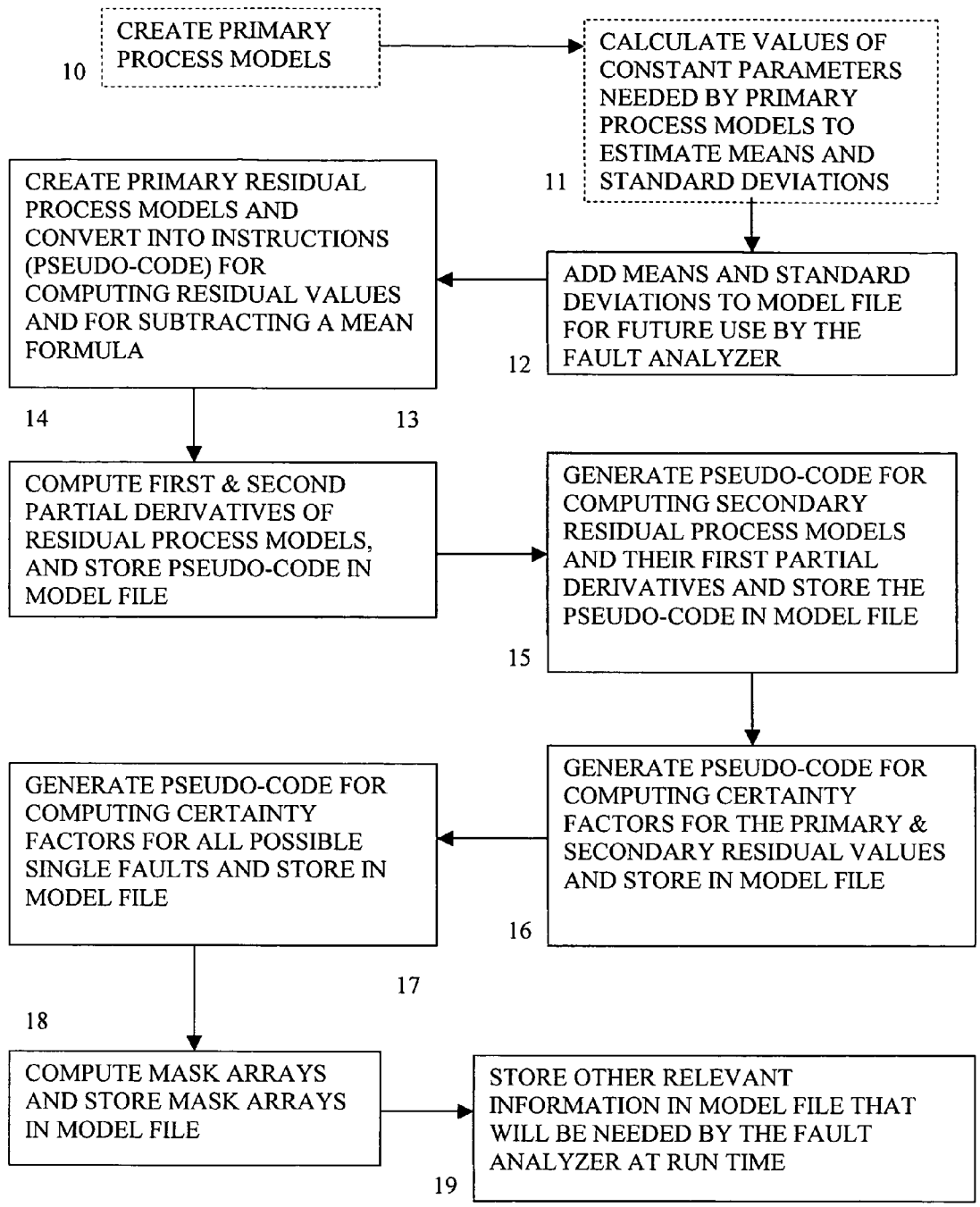
FIG. 1 is a flowchart illustrating processing of process models and data in the present invention.

At the outset, it should be clearly understood that like reference numerals are intended to identify the same elements, parts or portions consistently throughout the several drawing figures, as such elements, parts or portions may be further described or explained by the entire written specification, of which this detailed description is an integral part. Unless otherwise indicated, the drawings are intended to be read together with the specification, and are to be considered a portion of the entire written description of this invention.

The present invention provides an improved system and method for simultaneous real-time monitoring, sensor validation, optimization and/or predictive fault analysis in a process control system. A basic approach to sensor validation and fault analysis in the present invention is an examination of relationships between sensor values and the inference of possible sensor failures, or failures in other parts of a process, by, among other things, determining which relationships differ from expectations. A process (such as in a chemical process plant) has a number of process variables, some of which are measured by sensors (measured variables), such as temperatures, pressures and flows, and some of which are not (unmeasured variables), such as leaks or component concentrations. Unmeasured variables may be difficult to measure, or uneconomical to measure since they may reliably be expected to have known values.

Process engineers design plants and processes such that certain relationships hold between such process variables when a process is in operation. Before the present invention is implemented, a plant engineer or other person typically provides a model or formula for computing a residual which assumes perfect measurements and perfect modeling of the process. For example, liquids may flow in and out of a tank through pipes. Three process variables in such a process might be flow-in, flow-out, and level-in-tank. In such a case, one expected relationship (if the tank or pipes are not leaking) is:

flow-out=flow-in−$k$ $d$(level-in-tank)/$dt$ where k is a constant that depends on the dimensions of the tank. Such an equation is referred to as a primary process model. To measure the extent to which this relationship holds, a residual process model may be generated by subtracting one side of the equation from the other side of the equation. The residual process model corresponding to the above equation would therefore be:

flow-residual=flow-out−flow-in+$k$ $d$(level-in-tank)/$dt$

More generally, such a residual process model may be represented generically as follows:

residual=$f(x_1,x_2,\ldots,x_n)$ where $x_1,x_2,\ldots,x_n$ are process variables, i.e., parameters that define the state of a process at any given moment, and $f$ is a function of those parameters that computes a balance of energy or mass in a control volume.

Because the sensors that measure the three process variables in the tank example may not be 100 percent accurate or provide exact readings; because the process models may not be perfect models of the relationship between the process variables; and because random perturbations may occur, it is empirically observed that flow-residual is not always zero, though it is usually close to zero when the process is operating normally. The mathematical model of sensor validation and predictive fault analysis ("SV&PFA") used in the present invention requires that all residuals be zero, on average, when a monitored process is normal. Therefore, a calculation is made from historical plant data of the average value of each residual (flow-residual in this example) and that average value is subtracted from the corresponding residual process model.

In practice, then, each function $f$, above, will behave like a statistical random variable having a mean value $\beta$ and a standard deviation $\sigma$. The mean value $\beta$ is modeled as $\beta_0\rho$ and the standard deviation $\sigma$ is modeled as $\sigma_0\rho$, where $\beta_0$ and $\sigma_0$ are constants and $\rho$ is either 1 or a process variable that is the definitive measure of the production level of the process being monitored. Usually, $\beta$ is just a constant value, but sometimes it is the product of a constant times a process variable whose value determines the level of production at which the process is operating.

In the present invention, the generic residual process model above is replaced with a primary residual process model defined as:

$r=f(x_1,x_2,\ldots,x_n)-\beta$ which has a mean value of zero and a standard deviation of $\sigma$. The equation defining r is referred to herein as a primary residual process model. The invention examines the values of such (adjusted) residual process models and, among other things, infers from the pattern of deviations from zero which sensors are faulty or which other parts of the process may be faulty.

In more generic terms, if a plant engineer provides the formula $f(\ldots)$ as the formula for a residual process model under ideal conditions, and the formula mean for the average of $f(\ldots)$ over time based on historical plant data, and the formula sigma for the standard deviation of $f(\ldots)$ over time, a software program that embodies the present invention generates the primary residual process model:

$r=f(\ldots)-\text{mean}$ which has the property that the average of r is expected to be zero. These are preferred forms for these formulas (the constants are put in a special array), but any formula that can be expressed in the mathematical language of a software program is allowed. The formula sigma is not used in the primary residual process models, but is used to calculate certainty factors, as discussed below.

Primary residual process models are distinguished from certain linearly dependent residual process models generated by the present invention. Such additional models are referred herein to as secondary residual process models, and are computed as follows: Suppose that $r_1$ and $r_2$ are primary residual process models and both contain a common variable v. If both residual models are linear functions of v, they may be combined algebraically to remove the terms containing v. In this invention, such residual models are determined to be linear functions of v by symbolically computing their first and second partial derivatives with respect to v. If their first partial derivatives are not uniformly zero, but their second partial derivatives are uniformly zero (that is, they are zero no matter what the values of the process variables are), then they are linear with respect to v. The secondary residual process model computed in this example is:

$r_3=(\partial r_2/\partial v)r_1-(\partial r_1/\partial v)r_2$

The standard deviation computed for this secondary residual process model is:

$$\text{sigma}_3 = \sqrt{((\partial r_2/\partial v)\text{sigma}_1)^2 + ((\partial r_1/\partial v)\text{sigma}_2)^2}$$

where $\text{sigma}_1$ and $\text{sigma}_2$ are the standard deviations of residuals $r_1$ and $r_2$, respectively.

Referring now to FIG. 1, which is a flowchart illustrating the generation and processing of residual process models and data, the first step 10 is the creation of primary process models by a plant engineer or other person, as described above. The next step 11 is the calculation of values of constant parameters needed by such primary process models to estimate corresponding means and standard deviations from normal process data. In one embodiment, this calculation requires analysis of approximately 3 to 6 months of normal process data. Steps 10 and 11 may be performed prior to the method of the present invention. Next, such means and standard deviations are added to a model file for future use by the fault analyzer of the present invention 12. The next step 13 involves creation of primary residual process models and their conversion into instructions, referred to as pseudo-code, for computing residual values and for subtracting a mean formula. Such instructions may also take the form of native code, such as Visual Basic, in this Figure and elsewhere. The next step 14 is the computation of first and second partial derivatives of the primary residual process models, and the storage of pseudo-code in the model file. Next, pseudo-code is generated for computing secondary residual process models and their first partial derivatives, which is stored in the model file 15. In the next step 16, pseudo-code is generated for computing certainty factors for primary and secondary residual values and stored in the model file. Next, in step 17, pseudo-code is generated for computing certainty factors for all possible single faults, which are stored in the model file. Mask arrays are then computed and stored in the model file 18. As used herein, "mask arrays" include residual-to-variable relevance tables or information. Finally, in FIG. 1, other relevant information is stored in the model file that will be needed by the fault analyzer 19. This may include array sizes to be dynamically allocated and filled with data from a model file and/or the number of temporary variables generated to store intermediate results computed in prior steps.

A preferred embodiment of the present invention computes certainty factors to identify faults and/or validate underlying assumptions. As used below, a "fault" is a pair consisting of a process variable v and a direction d, and is designated as <v, d>. The value of d can be either high or low, which are in turn defined by high=1 low=−1

For some quantities, the invention is not concerned with values, but only whether they are positive or negative. The sign function is used in this regard:

$$\text{sign}(x) = 1 \text{ if } x > 0$$
$$= 0 \text{ if } x = 0$$
$$= -1 \text{ if } x < 0$$

At least two different functions for computing certainty factors from residuals may be used. Both functions produce bell-shaped curves when they are graphed. A first function, a Gaussian function, is defined as:

$$\text{Gauss}(x, \text{sigma}) = e^{\wedge}(-(x/\text{sigma})^2/2)$$

where sigma is the standard deviation of the process variable x. As used herein, a second function, referred to herein as the Kramer function, is defined as follows:

$$\text{Kramer}(x, \text{sigma}) = 1/(1 + (x/(3\text{sigma}))^{2n})$$

where sigma is again the standard deviation of the process variable x. In a preferred embodiment, n is 3. However, this may be modified in this preferred embodiment and may be another value in other embodiments. The function referred to herein as the Kramer function is derived from Kramer, M. A., *Malfunction Diagnosis Using Quantitative Models and Non-Boolean Reasoning in Expert Systems*, AlChE Journal 33, pp. 130-147, which is incorporated herein by reference.

When an embodiment of the present invention monitors a process, it reads real-time sensor data, computes the associated primary and/or secondary residual values and their standard deviations, and then calculates three certainty factors for each residual value, as needed. Let r be one of the residual values and let sigma be its standard deviation. Residual r is expected to be zero, but often it is not. If it is only a little off from zero, the invention considers it to be satisfactory, but the farther away from zero it gets, there exists less confidence that it is satisfactory. Using the Kramer function, the certainty factor for r being satisfactory is represented in this embodiment as:

$$cf(r, sat) = \text{Kramer}(r, \text{sigma})$$

If r is much greater than zero, it is considered to be high, that is, higher than it is supposed to be. The certainty factor for r being high is represented as:

$$cf(r, \text{high}) = 1 - \text{Kramer}(r, \text{sigma}) \text{ if } r > 0$$
$$= 0 \text{ otherwise}$$

Similarly, if r is much less than zero, it is considered to be low. The certainty factor for r being low is represented as:

$$cf(r, \text{low}) = 1 - \text{Kramer}(r, \text{sigma}) \text{ if } r < 0$$
$$= 0 \text{ otherwise}$$

To achieve some computational efficiency, the present embodiment computes an intermediate value which is referred to as the compressed value for r:

$$\text{compressed-value}(r) = \text{sign}(r)(1 - \text{Kramer}(r, \text{sigma}))$$

This one number is stored and used later to compute the three certainty factors using the following formulas:

$$cf(r, sat) = 1 - |\text{compressed-value}(r)|$$
$$cf(r, \text{high}) = \text{compressed-value}(r) \text{ if } r > 0$$
$$= 0 \text{ otherwise}$$
$$cf(r, \text{low}) = -\text{compressed-value}(r) \text{ if } r < 0$$
$$= 0 \text{ otherwise}$$

The use of a compressed value in this embodiment reduces computation, but gives identical results to the results given by the first definitions above. If the Gaussian function is used, Gauss is substituted for Kramer in the above certainty factor and compressed value formulas. The invention may be implemented without the use of a compressed value.

As stated above, for purposes of calculating certainty factors for faults, <v, d> signifies a fault; that is, v is a process variable and d is a direction, either high or low. To compute the certainty factor that a fault is present, the certainty factors for the primary and/or secondary residuals are examined to find evidence for the fault. If r is a residual, r provides evidence for fault <v, d> when it has deviated from zero in a direction that is consistent with variable v deviating in the direction d. For example, if $\partial r/\partial v$ is greater than zero, then both v and r can be expected to go high (or low) at the same time. If, however, $\partial r/\partial v$ is less than zero, then v and r can deviate in opposite directions. The certainty factor for r in the appropriate direction is then the strength to which r can provide evidence for the fault. One strong piece of evidence for the fault is enough to strongly conclude that the fault is present, unless there is also strong evidence that it is not present.

The evidence for fault <v, d> is this set of certainty factors for all relevant residuals:

evidence-for-fault(<v,d>)={cf(r,sign($\partial r/\partial v$)d)|($\partial r/\partial v$) ≠0 and r is a primary residual}

In some applications, the certainty factor for any residual, primary or secondary, may be included in this set. The strength of the evidence for the fault is the maximum of the values in this set.

Similarly, if a residual deviates in the opposite direction from what is expected when the fault is present, that deviation is evidence against the fault being present. The evidence against fault <v, d> is this set of certainty factors for all relevant residuals:

evidence-against-fault(<v,d>)={cf(r,−sign($\partial r/\partial v$)d)| ($\partial r/\partial v$)≠0}

Certainty factors for both primary and secondary residuals may be included in this set. The strength of the evidence against the fault is the maximum of the values in this set. If that value is subtracted from one, the strength to which this evidence is consistent with the fault being present is determined.

An additional consideration is significant in evaluating a certainty factor for a fault. Some residuals are not functions of v and so are not expected to deviate from zero when the fault <v, d> is present. The secondary residual process model that was formed by eliminating v from two primary residual process models is such a residual. It is relevant to evaluating the presence of the fault, so this secondary residual is expected to have a high certainty factor of being satisfactory when the fault involves v. Also, if two primary residual process models were combined to generate a secondary residual process model by eliminating some variable other than v, and one of these primary residuals is a function of v but the other is not, it is expected that the primary residual that is not a function of v is satisfactory. This primary residual is considered relevant to the fault as well.

Some primary residual process models may not be functions of v and are not combined with any models that are. These are considered to be not relevant to the fault <v, d>. Another fault can be present and cause them to deviate from zero, but this will not affect the assessment for fault <v, d>. This allows a diagnosis of the presence of several single faults that happen not to interact with each other. In addition, r may be a function of v, but at the moment, ($\partial r/\partial v$)=0. The neutral-evidence for fault <v, d> is this set of certainty factors for all relevant residuals:

neutral-evidence(<v,d>)={cf(r,sat)|r is relevant as neutral-evidence for v}

The strength of this evidence is the minimum of the set because if any one of the residuals that are supposed to be satisfactory is in fact high or low, that weakens the evidence for the fault <v, d>.

The certainty factors in these three sets, evidence-for-fault, neutral-evidence, and evidence-against-fault, are considered as fuzzy logic values, and are combined using a common interpretation of fuzzy "AND" as the minimum function, fuzzy "OR" as the maximum function, and fuzzy "NOT" as the complement function (1 minus the value of its argument). For finite sets, the quantifier "SOME" is just the "OR" of the values in the set, so it is equivalent to taking the maximum of the set. Similarly, for finite sets, the quantifier "ALL" is just the "AND" of all the values in the set, so it is equivalent to taking the minimum of the set. Putting this all together, the certainty factor for fault <v, d> is defined in this embodiment as:

cf(<v,d>)=SOME(evidence-for-fault(<v,d>)) AND ALL(neutral-evidence(<v,d>)) AND NOT (SOME(evidence-against-fault(<v,d>)))

If this value is above a threshold, it is displayed as a possible fault.

Regarding the display of a fault <v, d>: If v is a measured variable, the sensor value for that variable was substituted for the variable in computing all the primary and secondary residual values. If d=high, a conclusion is drawn that the sensor reading is higher than the true value for that process variable. If d=low, a conclusion is drawn that the sensor reading is lower than the true value for that process variable. In either case, a conclusion is drawn that the sensor is at fault. If cf(<v, d>) is about zero for both cases, d=high and d=low, then the sensor reading has been validated.

In the case of an unmeasured variable v, such as a leak, a high certainty factor for <v, low> means that the assumed value of v, which can be viewed as the reading from a virtual sensor, is low compared to the actual value. In order to display a conclusion about the actual value of the unmeasured variable, a preferred embodiment of the invention displays a message that v is high in this case (i.e., there is a positive leak out of the process). Similarly, if the certainty factor for <v, high> is high, it displays a message about v being low. If neither of these cases apply, a conclusion is drawn that the real value of v is about equal to its assumed value.

The fuzzy logic rule above may be generalized to sets of faults by redefining what counts as evidence for the set, evidence against the set, and what counts as neutral-evidence. An inference may be drawn that a set of faults is present when no subset of them may be inferred to be present. In particular, this means there must be at least one residual value for each fault deviating in the direction that the fault can cause. This leads to the following general fuzzy rule of this invention: Let fault-set={<$v_1,d_1$>, . . . ,<$v_n,d_n$>}

Then $$cf(\text{fault-set}) = \text{SOME}(\text{evidence-for-fault}(<v_1, d_1>)) \text{ AND}$$
$$\vdots$$
$$\text{SOME}(\text{evidence-for-fault}(<v_n, d_n>)) \text{ AND}$$
$$\text{ALL}(\text{neutral-evidence}(\text{fault-set})) \text{ AND}$$
$$\text{NOT}(\text{SOME}(\text{evidence-against}(\text{fault-set})))$$

The component evidence sets are defined as follows:

The set evidence-for-fault($<v_i, d_i>$) is the set of $cf(\partial r,$ sign $(\partial r/\partial v_i)d_i)$ such that r is a primary residual and $(\partial r/\partial v_i) \neq 0$. It is the same set that was used for single faults.

The set neutral-evidence(fault-set) is the set of $cf(r,$ sat) such that r is relevant to one or more of the faults in fault-set as neutral-evidence and such that $(\partial r/\partial v)=0$ for all the variables v in fault-set.

The set evidence-against(fault-set) is the set of $cf(r, -$sign$(\partial r/\partial v)d)$ such that $(\partial r/\partial v) \neq 0$ for at least one variable v in fault-set provided that $-$sign$(\partial r/\partial v)d$ has the same value for all such variables v in fault-set. (In other words, all the faults that can influence r must influence it in the same direction; if two faults can influence r to deviate in opposite directions, we can learn nothing about fault-set from that residual.)

The generalized rule may be limited to compute only certainty factors for pairs of faults.

Figure 2:
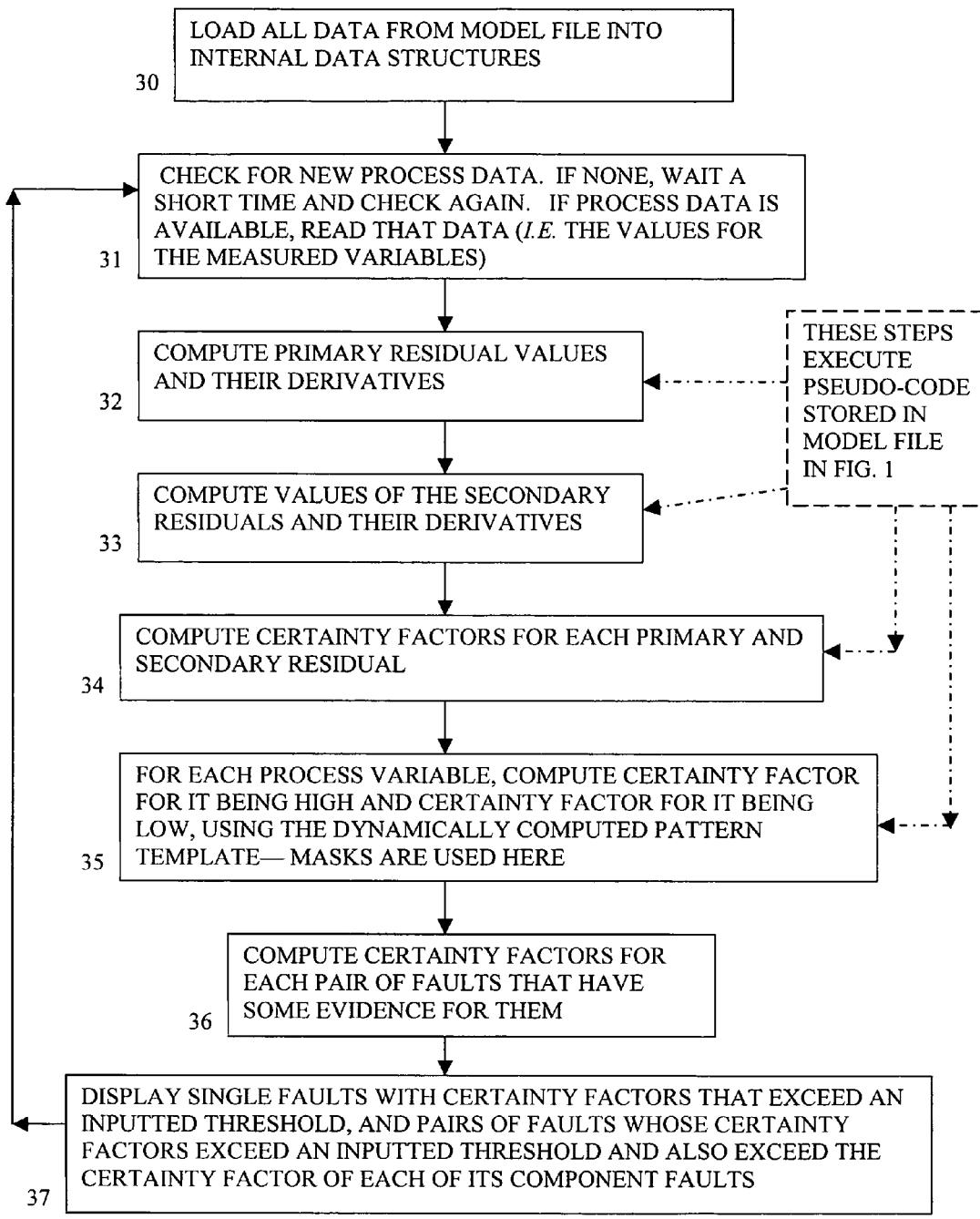
FIG. 2 is a flowchart illustrating certain sensor validation and fault analysis aspects of the present invention.

Referring now to FIG. 2, which is a flowchart illustrating sensor validation and predictive fault analysis aspects of the present invention, data from the model file is first loaded into internal data structures 30. Next, a check is made for new process data 31. If none, the invention waits a short time and checks again. When process data is available, the data is read, i.e., the values for the measured variables are updated. In the next step, primary residual values and their derivatives are computed 32.

Next, secondary residuals, if any, and their derivatives are computed 33. In the next step, certainty factors for each primary and/or secondary residual are computed 34. For each process variable, certainty factors are computed for it being high and for it being low using a dynamically computed pattern template 35. The use of a dynamically computed pattern template in FIG. 2 refers to the regeneration of the diagnostic rule. Each of steps 32 through 35 execute pseudo-code stored in the model file referred to in FIG. 1.

Next, in FIG. 2, certainty factors are computed for each pair of faults that have some evidence for them 36. Finally, single faults are displayed with certainty factors that exceed an inputted or predetermined threshold, and pairs of faults are displayed whose certainty factors exceed an inputted or predetermined threshold and also exceed the certainty factors for each of its component faults 37. After this step, the method returns to step 31 and repeats.

Code which implements the computation of the certainty factors for single and double faults in this embodiment is set forth below. The code set forth herein illustrates several examples, but should not be construed so as to limit the scope of the invention. The invention may be implemented in a number of programming languages and may be fixed in any computer-readable medium including without limitation any computer memory, floppy disks, hard disks, optical disks, CD-ROM, Flash ROM, non-volatile ROM, and RAM.

The function that computes the certainty factor for the nth variable, which is denoted by Vn, follows. For a given residual r, the code calls three functions, $cf$High(r), $cf$Low(r) and $cf$Satisfactory(r), which compute the values $cf$(r, high), $cf$(r, low) and $cf$(r, sat) as defined earlier. The variable m denotes the number of primary residuals and the variable dm denotes the number of secondary residuals that are being processed by the code. If function parameter d is True, it computes $cf$(Vn, high); if d is False, it computes $cf$(Vn, low). The function contains two FOR loops, one for evaluating the primary residual process model ("PMR" in the code) and one for evaluating the secondary residual process model ("SMR" in the code). They are the same except for which set of residual process models they operate on. In the code below, lines are numbered on the right, and corresponding footnotes are below. Two auxiliary arrays are used: pmrMask and pmrPattern. There are corresponding arrays for the smrs as well. Array pmrMask holds some strings of 0s and 1s to indicate which residuals are relevant to which variables. Array pmrPattern indicates whether the variable and the residual change in the same direction, the opposite direction, or that the residual does not change when the variable changes. These conditions correspond to the pattern values 1, −1, and 0, respectively. The pattern value is 0 if it is known that the formula for the residual does not contain the variable Vn or if the derivative of the residual with respect to Vn is 0. More accurately, the pattern value for residual i with respect to variable Vn is the sign of the derivative of pmr i with respect to Vn if Vn is a measured variable, and it is minus the sign of the derivative of pmr i with respect to variable Vn if Vn is an unmeasured variable (e.g., a leak). The difference in treatment is due to the fact that for a measured variable, conclusions are drawn about the measurement of the process variable, and for an unmeasured variable, conclusions are drawn about the process variable itself.

Relevant residuals can be divided into two classes: neutral residuals (pattern value=0) and affected residuals. Depending on the direction in which an affected residual has changed, it might be evidence for Vn being a fault (in the direction indicated by d) or it might be evidence against Vn being a fault. The local variable minSoFar keeps track of the minimum $cf$Satisfactory value for the neutral residuals. For the affected residuals, maxFor keeps track of the maximum certainty factor for those residuals that are evidence for the Vn fault, and maxAgainst keeps track of the maximum certainty factor for those residuals that are evidence against the fault. The certainty factor of the Vn fault is then the minimum of minSoFar, maxFor, and (1−maxAgainst).

Note that if the Vn fault can cause pmr i to rise, the $cf$High value for pmr i is the certainty level to which pmr i is evidence for the fault, and the $cf$Low value for pmr i is the certainty level to which pmr i is evidence against the fault. The opposite holds true if the fault can cause pmr i to fall. If maxAgainst is the certainty factor of the strongest evidence against the fault, then the certainty factor for the fault cannot be any higher than 1−maxAgainst. The calculation 1−X is the fuzzy version of NOT(X). Basically, the rule being used is the fuzzy version of the Boolean rule:

FAULT-IS-PRESENT=SOME(evidence-for-fault)
AND ALL(neutral-evidence) AND NOT (SOME (evidence-against-fault))

The code for computation of certainty factors for single and double faults:

```
Function computedVarCF(n As Integer, d As Boolean) As Double
    Dim minSoFar As Double
    Dim maxFor As Double
    Dim maxAgainst As Double
    Dim i As Integer
    Dim cf As Double
    minSoFar = 1
    maxFor = 0
    maxAgainst = 0
    For i = 1 To m
        If Mid(pmrMask(n), i, 1) = "1" Then                            [1]
            If pmrPattern(n * m + i) = 0 Then                          [2]
                minSoFar = min(minSoFar, cfSatisfactory(pmrCF(i)))
            ElseIf pmrPattern(n * m + i) = 1 Then                      [3]
                If d Then                                              [4]
                    maxFor = max(maxFor, cfHigh(pmrCF(i)))
```

-continued

```
            maxAgainst = max(maxAgainst, cfLow(pmrCF(i)))
          Else
            maxFor = max(maxFor, cfLow(pmrCF(i)))
            maxAgainst = max(maxAgainst, cfHigh(pmrCF(i)))
          End If
        ElseIf pmrPattern(n * m + i) = -1 Then                     [5]
          If d Then                                                [4]
            maxFor = max(maxFor, cfLow(pmrCF(i)))
            maxAgainst = max(maxAgainst, cfHigh(pmrCF(i)))
          Else
            maxFor = max(maxFor, cfHigh(pmrCF(i)))
            maxAgainst = max(maxAgainst, cfLow(pmrCF(i)))
          End If
        End If
      End If
    Next
    For i = 1 To dm                                                [6]
      If Mid(smrMask(n), i, 1) = "1" Then
        If smrPattern(n * dm + i) = 0 Then
          minSoFar = min(minSoFar, cfSatisfactory(smrCF(i)))
        ElseIf smrPattern(n * dm + i) = 1 Then
          If d Then
            *maxFor = max(maxFor, cfHigh(smrCF(i)))
            maxAgainst = max(maxAgainst, cfLow(smrCF(i)))
          Else
            *maxFor = max(maxFor, cfLow(smrCF(i)))
            maxAgainst = max(maxAgainst, cfHigh(smrCF(i)))
          End If
        ElseIf smrPattern(n * dm + i) = -1 Then
          If d Then
            *maxFor = max(maxFor, cfLow(smrCF(i)))
            maxAgainst = max(maxAgainst, cfHigh(smrCF(i)))
          Else
            *maxFor = max(maxFor, cfHigh(smrCF(i)))
            maxAgainst = max(maxAgainst, cfLow(smrCF(i)))
          End If
        End If
      End If
    Next
    If d Then                                                      [7]
      var2High(n) = maxFor
    Else
      var2Low(n) = maxFor
    End If
    computedVarCF = min(minSoFar, min(maxFor, 1 - maxAgainst))
End Function
[1] If Mid(pmrMask(n), i, 1) = "1" then pmr i is relevant to Vn.
[2] If pmrPattern(n * m + i) = 0 then pmr i is neutral for Vn.
[3] If pmrPattern(n * m + i) = 1 then a change in Vn causes pmr i
to change in the same direction.
[4] If d then we are computing cf(Vn, high), else we are computing
cf(Vn, low).
[5] If pmrPattern(n * m + i) = -1 then a change in Vn causes pmr
i to change in the opposite direction.
[6] The smrs are handled exactly the same way as the pmrs.
[7] This If statement just saves the maxFor value to indicate when the
fault should be considered for double faults.
* The lines of code marked with * are used in those applications where the
certainty factor for any residual, primary or secondary, may be included
in the evidence-for-fault set, as referred to above.
```

Pairs of faults are computed by the subroutine below. It computes the certainty factor for the pair of variables Vi and Vj. If b is True, the fault with Vi is that it is high; if b is False, the fault is that Vi is low. Similarly, if c is True, a computation is made for the case where Vj is high, and if c is False, a computation is made for the case where Vj is low.

The strategy is to find the certainty factor of the evidence for the pair of faults, the certainty factor of there not being evidence against the pair of faults, and then take the minimum. For the pair of faults involving Vi and Vj, there must be SOME evidence for Vi, AND SOME evidence for Vj. Local variable maxISoFar is set to the maximum certainty factor for a residual that Vi can change, and local variable maxJSoFar is set to the maximum certainty factor for a residual that Vj can change. Local variable minSoFar is set to the minimum certainty factor of a residual that might count as evidence against the pair (the certainty factor used is the certainty that it is NOT in fact evidence against the pair of faults). The certainty factor for the pair of faults is the minimum of minSoFar, maxISoFar and maxJSoFar.

The code contains two FOR loops, one for the pmrs and one for the smrs. Otherwise, they are the same. Basically, the rule being used can be thought of as the fuzzy version of the boolean rule:

FAULT-PAIR-IS-PRESENT=SOME(evidence-for-first-fault) AND SOME(evidence-for-second-fault) AND ALL(neutral-evidence) AND NOT (SOME(evidence-against-pair))

One difficult aspect of fault pairs is determining what counts as neutral-evidence and what counts as evidence against the pair. In this embodiment, this is determined by the nextMin function used to update minSoFar. What counts as evidence for a fault is determined by function nextMax, which is used to update both maxISoFar and maxJSoFar. Both of those functions are called in the subroutine:

```
Sub pairCF(i As Integer, b As Boolean, j As Integer, c As Boolean)
    Dim minSoFar As Double
    Dim maxISoFar As Double
    Dim maxJSoFar As Double
    Dim finalCF As Double
    Dim iP As Integer
    Dim jP As Integer
    Dim k As Integer
    minSoFar = 1
    maxISoFar = 0
    maxJSoFar = 0
    For k = 1 To m
      If Mid(pmrMask(i), k, 1) = "1" Or
        Mid(pmrMask(j), k, 1) = "1" Then                           [8]
        If b Then                                                  [9]
          iP = pmrPattern(i * m + k)
        Else
          iP = -pmrPattern(i * m + k)
        End If
        If c Then                                                  [10]
          jP = pmrPattern(j * m + k)
        Else
          jP = pmrPattern(j * m + k)
        End If
        minSoFar = nextMin(minSoFar,                               [11]
          iP, jP, k, True)
        maxISoFar = nextMax(maxISoFar, iP, k, True)                [12]
        maxJSoFar = nextMax(maxJSoFar, jP, k, True)                [13]
      End If
    Next
    For k = 1 To dm
      If Mid(smrMask(i), k, 1) = "1" Or
        Mid(smrMask(j), k, 1) = "1" Then
        If b Then
          iP = smrPattern(i * dm + k)
        Else
          iP = -smrPattern(i * dm + k)
        End If
        If c Then
          jP = smrPattern(j * dm + k)
        Else
          jP = -smrPattern(j * dm + k)
        End If
        minSoFar = nextMin(minSoFar, iP, jP, k, False)
        maxISoFar = nextMax(maxISoFar, iP, k, False)
        maxJSoFar = nextMax(maxJSoFar, jP, k, False)
      End If
    Next
    finalCF = min(minSoFar, min(maxISoFar, maxJSoFar))
    If finalCF > displayThreshold Then                             [14]
      pairCount = pairCount + 1
      pairList = Array(i, b, j, c, finalCF, pairList)
```

-continued

```
        End If
End Sub
[8] If Mid(pmrMask(i), k, 1) = "1" Or Mid(pmrMask(j), k, 1) = "1" then
pmr k is relevant to either Vi or Vj (or both).
[9] If b then iP is set to the pattern value for pmr k with respect to
variable Vi; otherwise iP is set to minus the pattern value for pmr k with
respect to variable Vi. (If b is True, Vi is failing high, and if b is False,
Vi is failing low, so the direction of influence on pmr k changes.)
[10] If c then jP is set the same way iP was as explained in [9].
[11] Update minSoFar according to neutral and possibly negative
evidence.
[12] Update maxISoFar with evidence for Vi.
[13] Update maxJSoFar with evidence for Vj.
[14] If finalCF > displayThreshold then add the pair to the list of
fault pairs.
```

The NextMin function is used to update minSoFar whenever it sees neutral-evidence or possible evidence against the fault pair. Variable msf is the previous value of minSoFar. Variable iP is the pattern value for pmr k (if b is True) or smr k (if b is False) with respect to Vi, and variable jP is the pattern value for pmr k (if b is True) or smr k (if b is False) with respect to Vj. The residual k is classified as neutral or as evidence against the pair according to the following table:

TABLE A

| iP | jP | Neutral | Evidence Against Pair |
|----|----|---------|----------------------|
| 1  | 1  | No      | If residual is low   |
| 1  | 0  | No      | If residual is low   |
| 1  | -1 | No      | No                   |
| 0  | 1  | No      | If residual is low   |
| 0  | 0  | Yes     | No                   |
| 0  | -1 | No      | If residual is high  |
| -1 | 1  | No      | No                   |
| -1 | 0  | No      | If residual is high  |
| -1 | -1 | No      | If residual is high  |

If residual k is evidence against the pair because it is low (one or both variables Vi and Vj should be causing it to go high), the certainty that it is NOT in fact evidence against the fault pair is (1—the certainty factor of residual k being low). If residual k is evidence against the pair because it is high, the certainty that it is NOT in fact evidence against the fault pair is (1—the certainty factor of residual k being high). If the certainty factor for residual k as new evidence is lower than the previous minimum, that is what is returned to be the new value of minSoFar.

```
Function nextMin(msf As Double, iP As Integer, jP As Integer,
k As Integer, b As Boolean)
        Dim scf As Double
        If b Then
            scf = pmrCF(k)
        Else
            scf = smrCF(k)
        End If
        If iP = 0 And jP = 0 Then
            nextMin = min(msf, cfSatisfactory(scf))
        ElseIf (iP = 0 Or jP = 0 Or iP = jP) Then
            If iP = 1 Or jP = 1 Then
                nextMin = min(msf, 1 - cfLow(scf))
            ElseIf (iP = -1 Or jP = -1) Then
                nextMin = min(msf, 1 - cfHigh(scf))
            End If
        Else
            nextMin = msf
        End If
End Function
```

The function nextMax is used to update maxISoFar and maxJSoFar whenever it sees evidence for one of the faults. Internally, msf is the previous value of whichever program variable is being updated and iP is the pattern value for the fault that the evidence is for. Residual k is seen as evidence if iP is not 0. If iP is 1, the residual k should be high to be counted as evidence for the fault. IF iP is −1, the residual k should be low to be counted as evidence for the fault. Since we are looking for SOME evidence for the fault, the maximum of the certainty factors for such evidence is used. The variable b simply indicates whether the residual is a primary residual or a secondary residual.

```
Function nextMax(msf As Double, iP As Integer, k As Integer, b As
Boolean)
        Dim scf As Double
        If b Then
            scf = pmrCF(k)
        Else
            scf = smrCF(k)
        End If
        nextMax = msf
        If iP = 1 Then
            nextMax = max(msf, cfHigh(scf))
        ElseIf iP = -1 Then
            nextMax = max(msf, cfLow(scf))
        End If
```

The model compiler of a preferred embodiment of the present invention is a subroutine in the code which must be executed at least once before the code can perform sensor validation and predictive fault analysis. The purpose of the model compiler is to translate the primary process models provided by the plant engineer, etc. into a set of instructions, or pseudo-code, for computing primary residual values, secondary residual values, compressed values and partial derivatives in a form used by the fault analyzer to analyze plant data. The fault analyzer in this embodiment is a top-level subroutine with a set of auxiliary subroutines, which is called once each time new sensor data is read from the process.

When a user selects the compile operation, the model compiler processes the primary process models. The model compiler uses the recursive descent approach to parse the models and produce arrays and other data structures. The information from the measured variables table and the unmeasured variables table is stored in a symbol table, implemented as an array. Symbol tables are found in almost every compiler. The primary process models and the formulas for computing the means and standard deviations are parsed into what are called syntax trees. These are data structures representing equations and expressions with nodes that represent either a number, reference to a variable or array, or an operation or function call whose arguments are the nodes it is linked to. The recursive descent methodology for parsing, symbol tables and syntax trees can be found in any introductory textbook on compiling programming languages.

After the process models and auxiliary equations are represented by syntax trees, the generation of pseudo-code for use by the fault analyzer begins. This is when the compiler figures out how to compute the primary residual process models, the secondary residual process models, their compressed values and partial derivatives.

The model compiler performs the following steps:
1. Print out pseudo-code for computing calculated variables (time derivatives of measured process variables).
2. Print out pseudo-code for computing primary residual values, then symbolically differentiate the primary residual process models and print pseudo-code for calculating the first and second partial derivatives with respect to every relevant process variable.
3. Print pseudo-code for computing secondary residual values. All possible pairs of primary residual process models are considered. After the pseudo-code is printed, pseudo-code for calculating the first partial derivative(s) of the secondary residual process model is printed, using standard calculus formulas.
4. Print pseudo-code for computing compressed values.
5. Construct tables that show for each process variable which primary and secondary residual process models are relevant to faults in that process variable. Both the variables and residual values are denoted by positive integers, so these tables are just two-dimensional arrays, one for the primary residual process models, and one for the secondary residual process models.
6. Print pseudo-code for computing the certainty factors for each of the process variables being high or low.
7. Determine how many process variables will be needed by the fault analyzer. These include measured and unmeasured variables, and derivative variables created by the model compiler.
8. Compute masks. Masks are two-dimensional arrays representing the same information as the tables in step 5. One dimension is indexed by process variable, and the other dimension is indexed by residual (both denoted by positive integers).
9. Store the masks as strings of 0s and 1s in a table in the database. Next, the model compiler stores certain numbers in the database:
10. The number of secondary residual process models.
11. The number of process variables (measured, unmeasured, and derivative).
12. The number of pseudo-code instructions written.

During step 7, an index map array is filled in that maps the variable indices in the model compiler's symbol table into the corresponding indices that will be used in the fault analyzer. Some temporary variables created by the model compiler are not needed by the fault analyzer, namely partial derivatives that symbolically evaluate to a constant value, so the variables that are needed are renumbered. As the model compiler stores the pseudo-code in a table in the database, it changes the variable numbers according to the index map array so that they have the values of their position in the fault analyzer's symbol table. At this point, the compiler is done.

The system and method of the present embodiment passively interacts with a distributed control system, programmable logic controller, or a data historian, periodically analyzing the data being collected, and reporting results either locally to a personal computer or control console. In this embodiment, all results are reported in the form of intelligent alarms; i.e., time stamped messages indicating the type and severity of the specific problem(s) determined to be occurring. Reported problems may be specific faults occurring in the process and/or specific out-of-control process or equipment conditions. Operators interact with such intelligent alarms in a manner they are accustomed to, specifically acknowledging active alarms and clearing inactive ones. This embodiment in many cases will act as an extension of an existing alarm system via interpreting models of normal process operations and EWMA calculations.

In a preferred embodiment, a computer program that performs fault analysis loads the information obtained from a model development environment and then waits for the command to begin monitoring the process for faults. When a user gives this command, the analyzer periodically receives data consisting of the time of day and the current values of the measured variables. It then computes the primary and/or secondary residual values and the partial derivatives of the primary and/or secondary residual process models, and computes the certainty factors for all possible single faults and pairs of faults. The model development environment is used to maintain the process models and to set up the fault analyzer program with essential information. Basic user operations are:

(a) view and edit the model equations,
(b) save the model equations to a database (or other file),
(c) load the model equations from a database (or other file) where they were saved,
(d) encode the operations needed to calculate the primary model equations, their first and second partial derivatives with respect to the process variables, the model equations for the secondary residuals and their first partial derivatives, and the masks indicating relevant residuals sets for single faults, and save these to a database (or other file).

The fault sets and their certainty factors are displayed on a computer screen. An end-user may click on a fault set to see an explanation of why that fault set has the certainty value that is displayed for it. In this embodiment, this explanation takes the form of a table that shows for each relevant residual what certainty it has as evidence for the fault set, as evidence against the fault set and as neutral-evidence. A fault explanation window (with information such as that set forth in example Tables B and C below) lists all process models relevant to the given diagnosis along with evidence collected from those models to arrive at that diagnosis.

TABLE B

| PMR | Expected | Actual | For | Against |
|---|---|---|---|---|
| 1 | 0 | 0 | 1 | 0 |
| 3 | 0 | 0 | 1 | 0 |
| 4 | 0 | 0 | 1 | 0 |
| 10 | −1 | 0 | 0 | 0 |
| 11 | 0 | 0 | 1 | 0 |
| 13 | −1 | −.19 | .19 | 0 |
| 22 | 0 | .01 | .99 | .01 |
| 23 | 0 | 0 | 1 | 0 |

TABLE C

| SMR | Expected | Actual | For | Against |
|---|---|---|---|---|
| 4 | −1 | 0 | 0 | 0 |
| 10 | 1 | 0 | 0 | 0 |
| 11 | 1 | 0 | 0 | 0 |
| 12 | 1 | 0 | 0 | 0 |
| 13 | 1 | 0 | 0 | 0 |
| 14 | −1 | 0 | 0 | 0 |
| 23 | 1 | 0 | 0 | 0 |
| 69 | −1 | 0 | 0 | 0 |

The relevant primary (PMR) and secondary (SMR) residual process models used in this fault analysis are identified in the first column of Tables A and B by their respective identification numbers. Such residual process models are converted into compressed values for interpreting the evidence for potential faults. The values of the compressed values expected for those models are indicated in the second column. These may be −1, 0, or 1. Values of either 1 or −1 in the "Expected" column indicate that the corresponding residual process model depends upon the suspect variable and that the residual process model is positively or negatively correlated to it, respectively. A value of 0 indicates that the corresponding residual process model does not depend upon the suspect variable; i.e., changes in the variable do not affect the model residual or are "neutral" to the model residual. Such "neutral" models are included because they share other variables in common with the dependent model(s) and have been used in the generation of the secondary residual process models for fault analysis. The actual compressed value for each relevant residual is listed in the third column and is compared to the expected values to determine the evidence existing For and Against the suspect variable being at fault. If the expected value is 1, the evidence For the suspect variable being at fault is the positive actual value—actual values of 0 are considered no evidence. The evidence Against the suspect variable is the absolute value of a negative actual value. The exact opposite reasoning is applied when the expected value is −1. If a value of 0 is expected, the evidence For the fault is one minus the absolute value of the actual value. The evidence Against the fault is the absolute value of the actual value in this case.

An overall certainty factor or rating is computed directly from these For and Against values of all relevant primary and secondary residual process models with the fuzzy logic rule described herein. This value is then compared against preselected certainty factor threshold values to determine if an "intelligent alarm" should be given for the suspect fault. In one embodiment, only faults beyond these alarm limits are available for viewing with a fault explanation window.

One preferred embodiment of the method of the present invention includes the following functions:
(a) Periodically (i.e., at a sampling rate which needs to be determined for each particular process system) collecting a vector (i.e., a predetermined list) of currently sampled sensor measurements and relevant setpoints and control limit information (i.e., alarm limits, interlock limits, Standard Operating Condition ("SOC") limits);
(b) With this data, determining the current operating state of the process (e.g., process is being started up, process is in production within all SOC's, process is rapidly approaching interlock shutdown, etc.);
(c) If in an appropriate state, performing sensor validation and predictive fault analysis of the data. To accomplish this, SV&PFA first requires that the various primary (i.e., linearly independent) models of normal process operation be elucidated and at least two associated statistical parameters (i.e., standard deviation and normal offset of their residuals) be determined. Deriving primary models and associated statistical parameters typically requires close interaction with engineers, and analysis of approximately 3 to 6 months of normal process data. This collection of models is then compiled to create pseudo-code that forms the basis for further analysis. The invention uses this pseudo-code to automatically derive fuzzy logic diagnostic rules to assign certainty factors to all potential process faults. Both single and multiple faults with certainties above predetermined thresholds are presented to the process operators as "intelligent alarms";
(d) Operators may enable/disable specific primary models and sensors (and thus automatically enable/disable all primary models using those sensors) while the program is operating, whereupon the invention automatically adjusts the computations as needed to reflect such changes;
(e) If the process is in an appropriate state and after a specific time period has passed, performing SPC analysis of that data. Each sensor measurement being monitored will be used to calculate an EWMA, the particular calculation of which will depend on whether that measurement is a controlled variable or not;
(f) Operators may enable/disable specific process sensors from this analysis. This enabling/disabling is separate from that which can be done with those identical sensors in the SV&PFA analysis;
(g) Reporting the results of the SV&PFA and SPC analysis as intelligent alarms to the process operators and to a log file. Recording operator interactions (i.e., their acknowledgments of active alarms) also to this log file.

Although multiple faults occur less frequently than single faults, the present invention's ability to detect multiple faults is important because most major process disasters occur as a consequence of a series of two or more concurrent process fault situations. Furthermore, certain types of multiple fault situations occur much more frequently than others. Kramer, *Malfunction Diagnosis Using Quantitative Models and Non-Boolean Reasoning in Expert System,* describes three classes of such multiple faults as follows: (1) faults causing other faults (so called "induced failures"), (2) latent faults which are not detectable until additional faults occur, and (3) intentional operation in the presence of one or more faults, with the sudden occurrence of an additional fault. Also, not all deviations from normal process operation which impact the values of model residuals are necessarily process faults. For instance, unsteady state operation, unusually low production rates, changeover of a feed supply, normal process shutdown, etc. are all examples of events which may generate diagnostic evidence and thus need to be handled by the diagnostic logic. Since such events are much more frequent than even single fault situations, they need to be accounted for directly. A preferred embodiment directly diagnoses many legitimate paired multiple fault/event situations as well as all single fault/event situations detectable from the current process data. These plausible multiple fault/event pairs tend to have lower resolution (i.e., many possible combinations) which need to each be checked by the process operator before the best corrective action is taken. These diagnoses are thus a direct extension of the underlying diagnostic logic for single faults and although less plausible than concurrent single fault diagnoses, exhaustively deduce all potential explanations of the current deviations from normal process operation. In one embodiment, rather than computing pairs of faults, each fault <v, d> whose max(evidence-for (<v, d>)) exceeds the certainty factor for <v, d> is displayed. In this way, each possible fault is displayed at most once, either as a single fault or as a possible member of a multiple fault set.

In one embodiment, the system of the present invention includes the following program modules:
(a) Real-time Sensor Data Communication Bridge. This module handles communications between a distributed control system, programmable logic controller or data historian and a software program implementing the present invention. It periodically collects current sensor measurements and appropriate setpoints and other control system limits and records them into such a software program. It may allow results to be sent back to the operator control consoles. A bridge is developed for each specific application. Users may purchase such bridges from vendors who specialize in such software rather than trying to customize a bridge in every system each time. For example, Matrikon has developed over 500 such bridges for practically every standard control system based on the OPC (OLE for Process Control) Standard for windows client/server configurations. This interface is designed such that it cannot corrupt data in a distributed control system/programmable logic controller, rather only passively monitor that data. Sampling rates are application specific, but may be on the order of approximately every 15 seconds to a minute. These depend upon the inherent time constants of the actual process system and on the need to monitor the system dynamics with differential and integral terms in our models.

(b) Main Database Module. This module stores into a database measured and unmeasured variables, control system limit parameters, parameters needed for the SPC calculations, and the primary models of normal process operation and their associated statistical parameters. This database module may be, for example, an Access or SQL or MSDE database configured for each specific application.

(c) Master Module. The master module coordinates the operation of all the other modules in the following manner:
 1. Periodically polling the distributed control system, programmable logic controller or data historian through the communications bridge for current process sensor/parameter values.
 2. Analyzing this data with state transition logic to determine if further analysis is appropriate.
 3. If further analysis is appropriate, periodically calling both the SV&PFA and SPC modules with the updated process data. The frequency at which the SV&PFA module is called by the Master program is normally much higher than that of the SPC module. For the SV&PFA module, this frequency depends upon the dynamics of the process system but normally ranges from seconds to minutes. It must be frequent enough to evaluate any derivatives in accumulation terms in our models accurately and must be determined on a case by case basis. For the SPC module, the frequency is different for each sensor point being monitored and depends upon the various time constants inherent in the process system. This frequency for each sensor is specified as a multiple of the faster SV&PFA module call frequency.
 4. Combining the results derived from those modules as described below to determine the nature of alarms to present to the process operators. The time and text of the alarms are recorded to an alarm log as is the time at which the operators acknowledge those alarms and/or those alarms clear by themselves.

(d) State Transition Logic Module. This module determines the current state of the process in order to analyze collected data, and predicts the next state of the process to alert operators to impending interlock activations. That determines if further analysis is appropriate.

(e) SV&PFA Module. This module is periodically called by the Master Module if the process state is appropriate. It performs the following functions:
 1. Computing residuals of all primary and secondary residual process models with updated data.
 2. Converting residual values of those models into compressed values for being high, low and satisfied.
 3. Applying the fuzzy logic rules to compute certainty factors of all potential fault situations.

(f) SPC Module. This module is periodically called by the Master Module if the process state is appropriate. It performs the following functions:
 1. Computing EWMA, CUSUM or other common SPC method values and upper and lower control limits for each sensor point. With this information, an EWMA, CUSUM or other common SPC value is periodically calculated (on the order of one system time constant or so), along with its upper and lower SPC limits (so-called red alarm limits in this embodiment).
 2. Using those values to determine if a sensor value is under control, is going out of control, or is out of control.

The SPC Module allows continuous monitoring of process sensor readings to determine if they are under control or not. Its analysis is based upon an EWMA, CUSUM or other common SPC method of those readings over time. This analysis directly allows for out of control sensors to be flagged more quickly and at levels that may allow the process operators to intercede with the proper control actions necessary to mitigate the underlying process problems without unduly disrupting process operations. The analysis is done automatically without the need for the operators to collect and chart any process sensor readings. EWMA, CUSUM and other common SPC calculations such as those used in this invention are known to those skilled in the art.

There are two types of observed variables to contend with in this SPC analysis: controlled variables and uncontrolled variables. A different SPC interpretation is performed for each. Controlled variables have their calculated EWMA, CUSUM or other common SPC values compared to Upper Control Limits (UCL) and Lower Control Limits (LCL) centered on their setpoint to determine their control status. Uncontrolled variables have their current values compared to both UCL and LCL based on their previous EWMA, CUSUM or other common SPC value to determine their control status. Each of these calculations is described below. In one embodiment, exceeding either the UCL or LCL generates a red alarm (out of control); exceeding some fraction, such as $\frac{2}{3}$ of the UCL or LCL generates a yellow alarm (going out of control); else it is a green alarm (in control). This analysis will be periodically performed at a frequency that will be different for each sensor point being monitored. As explained, this frequency depends upon the various time constants inherent in the process system. This is necessary since the process data is auto-correlated and thus requires significant time between samples before unique information is forthcoming by the SPC analysis.

Using SPC to monitor the status of measured variables is an additional tool for optimizing process operations. It brings to bear a type of analysis shown to be useful with auto-correlated data, hopefully giving the process operators more timely alarms than those given by their process alarm system. This allows operators to respond with the appropriate control actions sooner.

(g) Operator Display Module. The alarms generated by the SV&PFA program for possible process faults and the SPC Module for particular process sensors are given a priority color. Red means IMMEDIATE ATTENTION REQUIRED; for example, either the associated fault has been determined to be highly plausible by the SV&PFA Module or that particular process variable is out of control as determined by the SPC Module. Yellow means CAUTION, for example that the associated component is in between an operational and failed state as determined by the SV&PFA Module or the particular process variable is going out of control as determined by the SPC Module.

Figure 3:
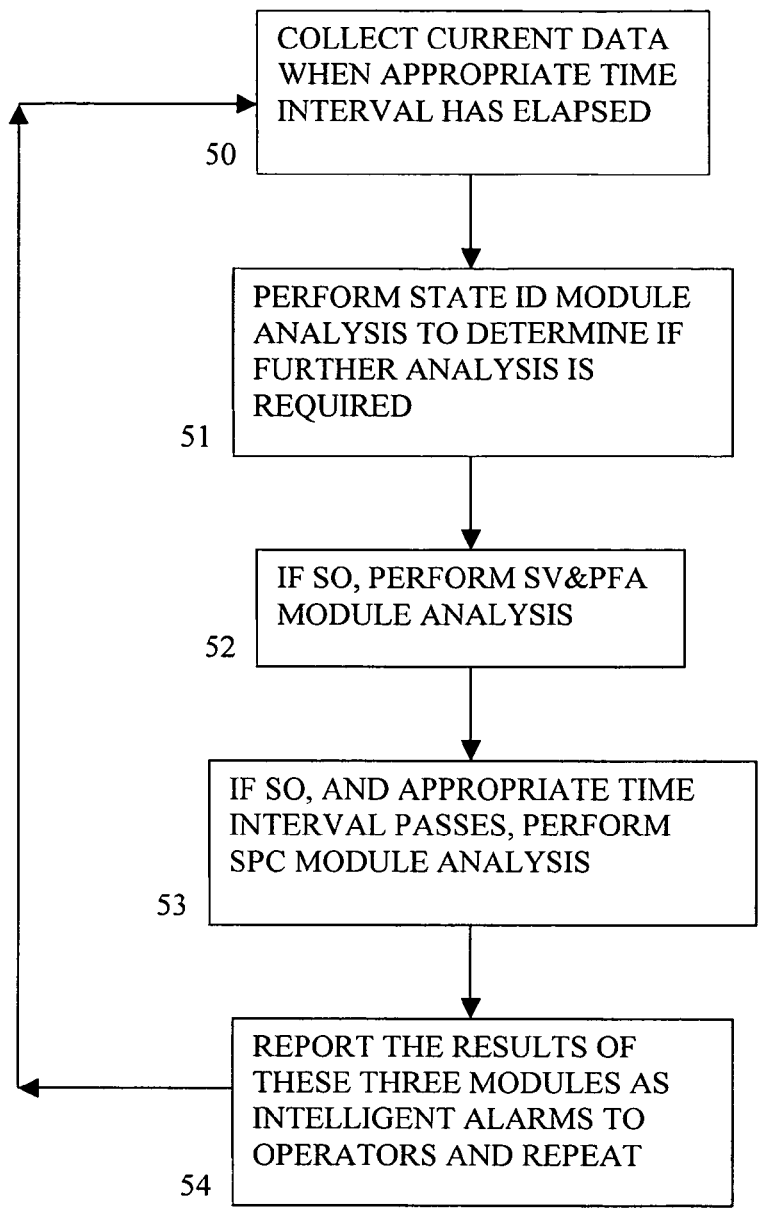
FIG. 3 is a flowchart illustrating certain steps in the method of the present invention.

The SV&PFA Module and the SPC Module each determine yellow and red alarms whenever appropriate. These yellow and red alarms can be displayed in the manner best suited for the user. In one embodiment, red alarms are displayed as blinking red alarm messages and yellow alarms as non-blinking yellow alarm messages. The operator is apprised of the red alarms only once by the display program and must acknowledge that alarm to stop it from blinking. If the underlying condition causing the blinking alarm subsequently is determined to no longer be present in the process, it disappears from the active alarm list. Yellow alarms are also not retained by the program if the underlying condition goes away; i.e., they automatically disappear from the active alarm list. Both yellow and red alarms and the acknowledgments of those alarms are logged by the display program. Operators are allowed to inhibit specific alarms for only a short period at a time (for example, 2 to 4 hours; this is configurable in the program). This reduces the nuisance of chatty alarms the operators are aware of while ensuring that the results of the SV&PFA and SPC analysis are not permanently ignored. Referring now to the drawings, FIG. 3 is a flowchart illustrating the present invention. In a first step 50, current data is collected if an appropriate or predetermined time interval has elapsed. Next, the State Transition Logic Module analysis is performed to determine if further analysis is required 51. If further analysis is required, the SV&PFA analysis is performed 52. If that analysis is performed, and an appropriate time interval passes, the SPC Module analysis is performed 53. Last, the results of these three modules are reported as intelligent alarms to operators 54, and the process repeats.

The software program of a preferred embodiment operates on a server connected either directly to a plant's control system or another server responsible for collecting either current or historical process data (these servers may be the same computer). There are at least five possible computer configurations for providing the results of the invention to an end-user. It may be set up as a Web service where the client(s) reside on either the same computer as the application server or another computer. It may be set up as a Web site using Web forms which consumes the Web service in order to render a display to the client/browser(s). It may be set up as a stand-alone Windows application (in this case there is just one client which resides on the same computer as the application). It may be set up as a client using windows forms subscribing to the Web service Application Programming Interface. It may also be part of another application, which uses the application's dynamic linked libraries to process information and returns its results to the parent application. There may be other means of operating the application and giving its results. In addition, the invention has in the preferred embodiment an application database (any Open Database Conductivity compliant database will work) which may reside on either another server or the same server the application resides on.

While there has been described what is believed to be the preferred embodiment of the present invention, those skilled in the art will recognize that other and further changes and modifications may be made thereto without departing from the spirit of the invention. Therefore, the invention is not limited to the specific details and representative embodiments shown and described herein. Accordingly, persons skilled in this art will readily appreciate that various additional changes and modifications may be made without departing from the spirit or scope of the invention, as defined and differentiated by the following claims. In addition, the terminology and phraseology used herein is for purposes of description and should not be regarded as limiting.

What is claimed is:

1. A method of monitoring, validation and analysis for a process control system having normal process data and sensors, and represented by a plurality of primary process models and a plurality of process variables, comprising:
    generating a plurality of primary residual process models derived from said primary process models, said normal process data, and one or more statistical parameters corresponding to said normal process data;
    measuring real-time sensor data;
    computing primary residual values of said primary residual process models corresponding to said real-time sensor data;
    deriving an expected value for one or more of said primary residual values from historical normal process data;
    determining deviations of said primary residual values from said corresponding expected values;
    mapping one or more of said deviations of said primary residual values from said corresponding expected values into one or more compressed values;
    automatically generating one or more fuzzy logic diagnostic rules;
    computing a certainty factor for a possible fault by applying said fuzzy logic diagnostic rules to said compressed values; and
    displaying said certainty factor on a monitor, computer screen or control console used for monitoring, validation and analysis for a process control system.

2. The method as set forth in claim 1, further comprising: measuring said normal process data.

3. The method as set forth in claim 1, further comprising: calculating said statistical parameters.

4. The method as set forth in claim 1, further comprising: computing a certainty factor corresponding to each of said primary residual values.

5. The method as set forth in claim 1 wherein said fuzzy logic is defined in a diagnostic rule that is regenerated each time said diagnostic rule is used.

6. The method as set forth in claim 1 wherein said fuzzy logic is defined in a diagnostic rule as follows;

> FAULT-IS-PRESENT=SOME (evidence-for-fault) AND ALL (neutral-evidence) AND NOT (SOME (evidence-against-fault)).

7. The method as set forth in claim 6, further comprising: determining a direction of deviation of said primary residual values from said expected values; and
    determining evidence-for-fault and evidence-against-fault by comparing said direction of deviation to an expected direction of deviation consistent with a fault.

8. The method as set forth in claim 6, further comprising: determining neutral-evidence by comparing the magnitude of a deviation of said primary residual values to zero.

9. The method as set forth in claim 1, further comprising: generating one or more secondary residual process models, wherein each of said secondary residual process models is derived from two primary residual process models having at least one common process variable.

10. The method as set forth in claim 9, further comprising: computing secondary residual values of said secondary residual process models corresponding to said real-time sensor data; and
    comparing said secondary residual values to expected values.

11. The method as set forth in claim 10, further comprising: determining a direction of deviation of said secondary residual values from said expected values;

comparing said direction of deviation to an expected direction of deviation consistent with a fault.

12. The method as set forth in claim 11 wherein said determination is made by calculating a first partial derivative of said secondary residual process model.

13. The method as set forth in claim 10, further comprising: computing a certainty factor for a possible fault as a function of one or more of said secondary residual values using fuzzy logic.

14. The method as set forth in claim 13, further comprising: computing a certainty factor corresponding to each of said secondary residual values.

15. The method as set forth in claim 13 wherein said fuzzy logic is defined in a diagnostic rule as follows:

FAULT-IS-PRESENT=SOME (evidence-for-fault)
 AND ALL (neutral-evidence) AND NOT (SOME
 (evidence-against-fault)).

16. The method as set forth in claim 15, further comprising: determining neutral-evidence from one or more of said secondary residual process models which do not relate to relevant process variables.

17. The method as set forth in claim 9 wherein said secondary residual process models are functions of both measured process variables and unmeasured process variables.

18. The method as set forth in claim 9, further comprising: regenerating said secondary residual process models.

19. The method as set forth in claim 1 wherein said statistical parameters comprise a mean and a standard deviation.

20. The method as set forth in claim 1 wherein said primary residual process models are functions of both a measured process variable and an unmeasured process variable.

21. The method as set forth in claim 1, further comprising: regenerating said primary residual process models.

22. The method as set forth in claim 1, further comprising: computing a first partial derivative and a second partial derivative of said primary residual process models.

23. The method as set forth in claim 1, further comprising: reporting said certainty factor if it exceeds a predetermined threshold.

24. The method as set forth in claim 1 wherein said certainty factor is between 0.0 and 1.0.

25. The method as set forth in claim 1, further comprising: evaluating said real-time sensor data using statistical process control charting techniques to determine if a corresponding sensor is in control.

26. The method as set forth in claim 1, further comprising: calculating the exponentially weighted moving average of said real-time sensor data to determine if a corresponding sensor is in control.

27. The method as set forth in claim 1, further comprising: computing a plurality of certainty factors for a corresponding plurality of possible faults.

28. A method of monitoring, validation and analysis for a process control system having normal process data and sensors, and represented by a plurality of primary residual process models and a plurality of process variables, comprising:
measuring real-time sensor data;
computing primary residual values of said primary residual process models corresponding to said real-time sensor data;
deriving an expected value for one or more of said primary residual values from historical normal process data;
determining deviations of said primary residual values from said corresponding expected values;
mapping one or more of said deviations of said primary residual values from said corresponding expected values into one or more compressed values;
automatically generating one or more fuzzy logic diagnostic rules;
computing a certainty factor for a possible fault by applying said fuzzy logic diagnostic rules to said compressed values; and
displaying said certainty factor on a monitor, computer screen or control console used for monitoring, validation and analysis for a process control system.

29. The method as set forth in claim 28, further comprising: computing a certainty factor corresponding to each of said primary residual values.

30. The method as set forth in claim 28 wherein said fuzzy logic is defined in a diagnostic rule that is regenerated each time said diagnostic rule is used.

31. The method as set forth in claim 28 wherein said fuzzy logic is defined in a diagnostic rule as follows:

FAULT-IS-PRESENT=SOME (evidence-for-fault)
 AND ALL (neutral-evidence) AND NOT (SOME
 (evidence-against-fault)).

32. The method as set forth in claim 31, further comprising: determining a direction of deviation of said primary residual values from said expected values; and
determining evidence-for-fault and evidence-against-fault by comparing said direction of deviation to an expected direction of deviation consistent with a fault.

33. The method as set forth in claim 31, further comprising: determining neutral-evidence by comparing the magnitude of a deviation of said primary residual values to zero.

34. The method as set forth in claim 28, further comprising: generating one or more secondary residual process models, wherein each of said secondary residual process models is derived from two primary residual process models having at least one common process variable.

35. The method as set forth in claim 34, further comprising: computing secondary residual values of said secondary residual process models corresponding to said real-time sensor data; and
comparing said secondary residual values to expected values.

36. The method as set forth in claim 35, further comprising: computing a certainty factor for a possible fault as a function of one or more of said secondary residual values using fuzzy logic.

37. The method as set forth in claim 36, further comprising: computing a certainty factor corresponding to each of said secondary residual values.

38. The method as set forth in claim 36 wherein said fuzzy logic is defined in a diagnostic rule as follows:

FAULT-IS-PRESENT=SOME (evidence-for-fault)
 AND ALL (neutral-evidence) AND NOT (SOME
 (evidence-against-fault)).

39. The method as set forth in claim 38, further comprising: determining neutral-evidence from one or more of said secondary residual process models which do not relate to relevant process variables.

40. The method as set forth in claim 35, further comprising: determining a direction of deviation of said secondary residual values from said expected values;
comparing said direction of deviation to an expected direction of deviation consistent with a fault.

41. The method as set forth in claim 40 wherein said determination is made by calculating a first partial derivative of said secondary residual process model.

42. The method as set forth in claim 34, further comprising: regenerating said secondary residual process models.

43. The method as set forth in claim 28, further comprising: regenerating said primary residual process models.

44. The method as set forth in claim 28, further comprising: computing a first partial derivative and a second partial derivative of said primary residual process models.

45. The method as set forth in claim 28, further comprising: evaluating said real-time sensor data using statistical process control charting techniques to determine if a corresponding sensor is in control.

46. The method as set forth in claim 28, further comprising: computing a plurality of certainly factors for a corresponding plurality of possible faults.

47. A method of monitoring, validation and analysis for a process control system having normal process data and sensors, and represented by a plurality of primary process models and a plurality of process variables, comprising:
generating a plurality of primary residual process models derived from said primary process models, said normal process data, and one or more statistical parameters corresponding to said normal process data;
automatically generating one or more secondary residual process models, wherein each of said secondary residual process models is derived from two primary residual process models having at least one common variable by combining said primary residual process models to remove any terms containing said common variable;
mapping one or more residual values into one or more compressed values;
using one or more of said primary residual process models, one or more of said secondary residual process models and said compressed values to predict a possible fault; and
displaying said possible fault on a monitor, computer screen or control console used for monitoring, validation and analysis for a process control system.

48. The method as set forth in claim 47, further comprising: measuring said normal process data.

49. The method as set forth in claim 47, further comprising: calculating said statistical parameters.

50. The method as set forth in claim 47, further comprising: measuring real-time sensor data.

51. The method as set forth in claim 50, further comprising: computing primary residual values and secondary residual values of said primary residual process models and said secondary residual process models corresponding to said real-time sensor data;
comparing said primary residual values and said secondary residual values to expected values; and
computing a certainty factor for a possible Fault using fuzzy logic.

52. The method as set forth in claim 51 wherein said fuzzy logic is defined in a diagnostic rule that is regenerated each time said diagnostic rule is used.

53. The method as set forth in claim 51, further comprising: computing a certainty factor corresponding to each of said primary residual values.

54. The method as set forth in claim 51, further comprising: computing a certainty factor corresponding to each of said secondary residual values.

55. The method as set font in claim 47, further comprising: regenerating said secondary residual process models.

56. The method as set forth in claim 47, further comprising: regenerating said primary residual process models.

57. The method as set forth in claim 47, further comprising: using one or more of said primary residual process models and one or more of said secondary residual process models to predict a plurality of possible faults.

58. A method of monitoring, validation and analysis for a process control system having normal process data and sensors, and represented by a plurality of primary process models and a plurality of process variables, comprising:
generating a plurality of primary residual process models derived from said primary process models, said normal process data, and one or more statistical parameters corresponding to said normal process data;
automatically translating said primary residual process models into executable pseudo-code;
measuring real-time sensor data;
executing said pseudo-code to compute primary residual values corresponding to said real-time sensor data;
deriving an expected value for one or more of said primary residual values from historical normal process data;
determining deviations of said primary residual values from said corresponding expected values;
mapping one or more of said deviations into one or more compressed values;
computing a certainty factor for a possible fault by executing said pseudo-code; and
displaying said certainty factor on a monitor, computer screen or control console used for monitoring, validation and analysis for a process control system.

59. The method as set forth in claim 58 wherein said pseudo-code uses fuzzy logic.

60. The method as set forth in claim 59 wherein said fuzzy logic is defined in a diagnostic rule that is regenerated each time said diagnostic rule is used.

61. The method as set forth in claim 59 wherein said fuzzy logic is defined in a diagnostic rule as follows:

FAULT-IS-PRESENT=SOME (evidence-for-fault)
AND ALL (neutral-evidence) AND NOT (SOME
(evidence-against-fault)).

62. The method as set forth in claim 61, further comprising: determining a direction of deviation of said primary residual values from said expected values; and
determining evidence-for-fault and evidence-against-fault by comparing said direction of deviation to an expected direction of deviation consistent with a fault.

63. The method as set forth in claim 61, further comprising: determining neutral-evidence by comparing the magnitude of a deviation of said primary residual values to zero.

64. The method as set forth in claim 58, further comprising: generating pseudo-code for computing a certainty factor; computing a certainty factor corresponding to each of said primary residual values.

65. The method as set forth in claim 58, further comprising: generating one or more secondary residual process models, wherein each of said secondary residual process models is derived from two primary residual process models having at least one common process variable.

66. The method as set forth in claim 65, further comprising: translating said secondary residual process models into pseudo-code;
measuring real-time sensor data;
executing said pseudo-code to compute secondary residual values corresponding to said real-rime sensor data; and
comparing said secondary residual values to expected values.

67. The method as set forth in claim 66, further comprising:
generating pseudo-code for computing a certainty factor;
computing a certainty factor corresponding to each of said secondary residual values.

68. The method as set forth in claim 67, wherein said certainty factor is computed using fuzzy logic.

69. The method as set forth in claim 65, further comprising:
determining neutral-evidence from one or more of said secondary residual process models which do not relate to relevant process variables.

70. The method as set forth in claim 58, further comprising:
computing a plurality of certainty factors for a corresponding plurality of possible faults.

71. A computer-readable medium having computer-executable instructions for performing a method for a process control system having normal process data and sensors, and represented by a plurality of primary process models and a plurality of process variables, said method comprising:
generating a plurality of primary residual process models derived from said primary process models, said normal process data, and one or more statistical parameters corresponding to said normal process data;
measuring real-time sensor data;
computing primary residual values of said primary residual process models corresponding to said real-time sensor data;
deriving an expected value for one or more of said primary residual values from historical normal process data;
determining deviations of said primary residual values from said corresponding expected values;
mapping one or more of said deviations of said primary residual values from said corresponding expected values into one or more compressed values;
automatically generating one or more fuzzy logic diagnostic rules;
computing a certainty factor for a possible fault by applying said fuzzy logic diagnostic rules to said deviations; and
displaying said certainty factor on a monitor, computer screen or control console used for monitoring, validation and analysis for a process control system.

72. The computer-readable medium as set forth in claim 71, said method further comprising:
measuring said normal process data.

73. The computer-readable medium as set forth in claim 71, said method further comprising:
calculating said statistical parameters.

74. The computer-readable medium as set forth in claim 71, said method further comprising:
computing a certainty factor corresponding to each of said primary residual values.

75. The computer-readable medium as set forth in claim 71 wherein said fuzzy logic is defined in a diagnostic rule that is regenerated each time said diagnostic rule is used.

76. The computer-readable medium as set forth in claim 71 wherein said fuzzy logic is defined in a diagnostic rule as follows:

FAULT-IS-PRESENT=SOME (evidence-for-fault)
AND ALL (neutral-evidence) AND NOT (SOME (evidence-against-fault)).

77. The computer-readable medium as set forth in claim 76, said method further comprising:
determining a direction of deviation of said primary residual values from said expected values; and
determining evidence-for-fault and evidence-against-fault by comparing said direction of deviation to an expected direction of deviation consistent with a fault.

78. The computer-readable medium as set forth in claim 76, said method further comprising:
determining neutral-evidence by comparing the magnitude of a deviation of said primary residual values to zero.

79. The computer-readable medium as set forth in claim 71, said method further comprising:
generating one or more secondary residual process models, wherein each of said secondary residual process models is derived from two primary residual process models having at least one common process variable.

80. The computer-readable medium as set forth in claim 79, said method further comprising:
computing secondary residual values of said secondary residual process models corresponding to said real-time sensor data; and
comparing said secondary residual values to expected values.

81. The computer-readable medium as set forth in claim 80, said method further comprising:
determining a direction of deviation of said secondary residual values from said expected values;
comparing said direction of deviation to an expected direction of deviation consistent with a fault.

82. The computer-readable medium as set forth in claim 81 wherein said determination is made by calculating a first partial derivative of said secondary residual process model.

83. The computer-readable medium as set forth in claim 80, said method further comprising:
computing a certainty factor for a possible fault as a function of one or more of said secondary residual values using fuzzy logic.

84. The computer-readable medium as set forth in claim 83, said method further comprising:
computing a certainty factor corresponding to each of said secondary residual values.

85. The computer-readable medium as set forth in claim 83 wherein said fuzzy logic is defined in a diagnostic rule as follows:

FAULT-IS-PRESENT=SOME (evidence-for-fault)
AND ALL (neutral-evidence) AND NOT (SOME (evidence-against-fault)).

86. The computer-readable medium as set forth in claim 85, said method further comprising;
determining neutral-evidence from one or more of said secondary residual process models which do not relate to relevant process variables.

87. The computer-readable medium as set forth in claim 79 wherein said secondary residual process models are functions of both measured process variables and unmeasured process variables.

88. The computer-readable medium as set forth in claim 79, said method further comprising:
regenerating said secondary residual process models.

89. The computer-readable medium as set forth in claim 71 wherein said statistical parameters comprise a mean and a standard deviation.

90. The computer-readable medium as set forth in claim 71 wherein said primary residual process models are functions of both a measured process variable and an unmeasured process variable.

91. The computer-readable medium as set forth in claim 71, said method further comprising:
regenerating said primary residual process models.

92. The computer-readable medium as set forth in claim 71, said method further comprising:
computing a first partial derivative and a second partial derivative of said primary residual process models.

93. The computer-readable medium as set forth in claim 71, said method further comprising:
reporting said certainty factor if it exceeds a predetermined threshold.

94. The computer-readable medium as set forth in claim 71 wherein said certainty factor is between 0.0 and 1.0.

95. The computer-readable medium as set forth in claim 71, said method further comprising:
evaluating said real-time sensor data using statistical process control charting techniques to determine if a corresponding sensor is in control.

96. The computer-readable medium as set forth in claim 71, said method further comprising:
calculating the exponentially weighted moving average of said real-time sensor data to determine if a corresponding sensor is in control.

97. The computer-readable medium as set forth in claim 71, said method further comprising:
computing a plurality of certainty factors for a corresponding plurality of possible faults.

98. A computer-readable medium having computer-executable instructions for performing a method for a process control system having normal process data and sensors, and represented by a plurality of primary residual process models and a plurality of process variables, said method comprising:
measuring real-time sensor data;
computing primary residual values of said primary residual process models corresponding to said real-time sensor data;
deriving an expected value for one or more of said primary residual values from historical normal process data;
determining deviations of said primary residual values from said corresponding expected values;
mapping one or more of said deviations of said primary residual values from said corresponding expected values into one or more compressed values;
automatically generating one or more fuzzy logic diagnostic rules;
computing a certainty factor for a possible fault by applying said fuzzy logic diagnostic rules to said deviations; and
displaying said certainty factor on a monitor, computer screen or control console used for monitoring, validation and analysis for a process control system.

99. The computer-readable medium as set forth in claim 98, said method further comprising:
computing a certainty factor corresponding to each of said primary residual values.

100. The computer-readable medium as set forth in claim 98 wherein said fuzzy logic is defined in a diagnostic rule that is regenerated each time said diagnostic rule is used.

101. The computer-readable medium as set forth in claim 98 wherein said fuzzy logic is defined in a diagnostic rule as follows:

FAULT-IS-PRESENT=SOME (evidence-for-fault)
AND) ALL (neutral-evidence) AND NOT
(SOME (evidence-against-fault)).

102. The computer-readable medium as set forth in claim 101, said method further comprising:
determining neutral-evidence by comparing the magnitude of a deviation of said primary residual values to zero.

103. The computer-readable medium as set forth in claim 98, said method further comprising:
determining a direction of deviation of said primary residual values from said expected values; and
determining evidence-for-fault and evidence-against-fault by comparing said direction of deviation to an expected direction of deviation consistent with a fault.

104. The computer-readable medium as set forth in claim 98, said method further comprising:
generating one or more secondary residual process models, wherein each of said secondary residual process models is derived from two primary residual process models having at least one common process variable.

105. The computer-readable medium as set forth in claim 104, said method further comprising:
computing secondary residual values of said secondary residual process models corresponding to said real-time sensor data; and
comparing said secondary residual values to expected values.

106. The computer-readable medium as set forth in claim 105, said method further comprising:
computing a certainty factor for a possible fault as a function of one or more of said secondary residual values using fuzzy logic.

107. The computer-readable medium as set forth in claim 106, said method further comprising:
computing a certainty factor corresponding to each of said secondary residual values.

108. The computer-readable medium as set forth in claim 106 wherein said fuzzy logic is defined in a diagnostic rule as follows:

FAULT-IS-PRESENT=SOME (evidence-for-fault)
AND ALL (neutral-evidence) AND NOT (SOME
(evidence-against-fault)).

109. The computer-readable medium as set forth in claim 108, said method further comprising:
determining neutral-evidence from one or more of said secondary residual process models which do not relate to relevant process variables.

110. The computer-readable medium as set forth in claim 105, said method further comprising:
determining a direction of deviation of said secondary residual values from said expected values;
comparing said direction of deviation to an expected direction of deviation consistent with a fault.

111. The computer-readable medium as set forth in claim 110 wherein said determination is made by calculating a first partial derivative of said secondary residual process model.

112. The computer-readable medium as set forth in claim 104, said method further comprising:
regenerating said secondary residual process models.

113. The computer-readable medium as set forth in claim 98, said method further comprising:
regenerating said primary residual process models.

114. The computer-readable medium as set forth in claim 98, said method further comprising:
computing a first partial derivative and a second partial derivative of said primary residual process models.

115. The computer-readable medium as set forth in claim 98, said method further comprising:
evaluating said real-time sensor data using statistical process control charting techniques to determine if a corresponding sensor is in control.

116. The computer-readable medium as set forth in claim 98, said method further comprising:
computing a plurality of certainty factors for a corresponding plurality of possible faults.

* * * * *